(12) United States Patent
Adams et al.

(10) Patent No.: US 6,898,048 B2
(45) Date of Patent: May 24, 2005

(54) PLENUM ASSEMBLY WHICH FILTERS MULTIPLE FLUIDIC CURRENT CHANNELS USING A SINGLE RECIRCULATION FILTER

(75) Inventors: Carl F. Adams, Yukon, OK (US); Jackson W. Nichols, Edmond, OK (US); Cory B. Welscher, Yukon, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 144 days.

(21) Appl. No.: 10/286,116

(22) Filed: Nov. 1, 2002

(65) Prior Publication Data

US 2003/0210492 A1 Nov. 13, 2003

Related U.S. Application Data

(60) Provisional application No. 60/380,525, filed on May 13, 2002.

(51) Int. Cl.[7] .............................................. G11B 33/14
(52) U.S. Cl. .................................................. 360/97.02
(58) Field of Search ........................... 360/97.02, 97.01, 360/88; 720/648, 649

(56) References Cited

U.S. PATENT DOCUMENTS

| | | | |
|---|---|---|---|
| 4,367,502 A | 1/1983 | Iftikar et al. .................. 360/86 |
| 4,471,395 A | 9/1984 | Beck et al. ............... 360/98.04 |
| 4,581,668 A | 4/1986 | Campbell ..................... 369/72 |
| 4,710,830 A | 12/1987 | Imai et al. ............... 360/97.03 |
| 4,780,776 A | 10/1988 | Dushkes .................. 360/78.12 |
| 4,857,087 A | 8/1989 | Bolton et al. .............. 55/385.6 |
| 5,012,365 A | 4/1991 | Yokoyama ............... 360/97.03 |
| 5,025,337 A | 6/1991 | Brooks .................... 360/97.03 |
| 5,101,305 A | 3/1992 | Ohkita et al. ............ 360/97.02 |
| 5,140,578 A | 8/1992 | Tohkairin ................ 369/75.21 |
| 5,205,337 A | 4/1993 | Bozzo ...................... 160/84.01 |
| 5,406,431 A | 4/1995 | Beecroft .................. 360/97.02 |
| 5,491,596 A | 2/1996 | Kobori .................... 360/97.03 |
| 6,077,335 A | 6/2000 | Schneider et al. ............ 96/135 |
| 6,097,569 A | 8/2000 | Haruyama ............... 360/97.03 |
| 6,226,145 B1 * | 5/2001 | Genheimer et al. ...... 360/97.02 |
| 2002/0039252 A1 * | 4/2002 | Tadepalli et al. ......... 360/97.02 |
| 2002/0071202 A1 * | 6/2002 | Myokan et al. .......... 360/97.02 |
| 2002/0149876 A1 * | 10/2002 | Sakata et al. ............ 360/97.02 |
| 2003/0197974 A1 * | 10/2003 | Hong et al. .............. 360/97.02 |

* cited by examiner

Primary Examiner—Julie Anne Watko
(74) Attorney, Agent, or Firm—Fellers, Snider, et al.

(57) ABSTRACT

A plenum assembly for use in a data storage device to direct and filter recirculating currents established by high speed rotation of a recording disc. The plenum assembly includes a top plate and a partitioning wall which projects from the top plate to form opposing, longitudinally extending first and second chambers. A first portion of the recirculating currents is directed along the first chamber and a separate, second portion of the recirculating currents is directed along the second chamber. A recirculation filter transversely extends across the first and second chambers and intersects the partitioning wall so that the respective first and second portions of the recirculating currents concurrently pass through adjacent sides of the recirculation filter before exiting the plenum assembly and merging into a combined set of recirculating currents.

29 Claims, 5 Drawing Sheets

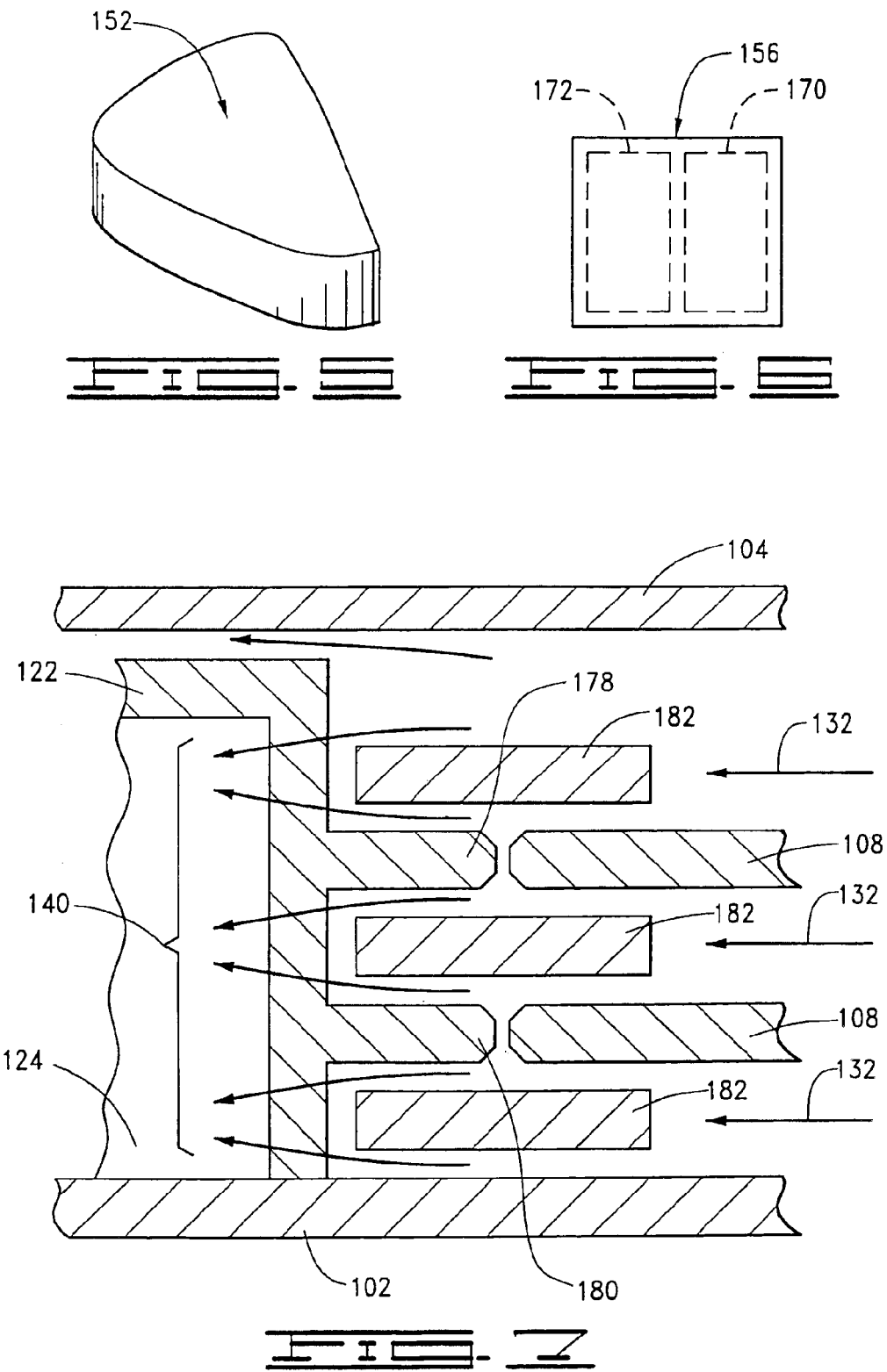

US 6,898,048 B2

PLENUM ASSEMBLY WHICH FILTERS MULTIPLE FLUIDIC CURRENT CHANNELS USING A SINGLE RECIRCULATION FILTER

RELATED APPLICATIONS

This application claims domestic priority under 35 U.S.C. §119(e) to U.S. Provisional Application No. 60/380,525 filed May 13, 2002.

FIELD OF THE INVENTION

The claimed invention relates generally to data storage devices and more particularly to the directing and filtering of recirculating currents established within a data storage device.

BACKGROUND

Disc drives are digital data storage devices which store and retrieve large amounts of user data in a fast and efficient manner. The data are magnetically recorded on the surfaces of one or more rigid data storage discs affixed to a spindle motor for rotation at a constant high speed.

An array of vertically aligned data transducing heads are controllably positioned by an actuator to read data from and write data to tracks defined on the recording surfaces. The heads are configured to be aerodynamically supported over the recording surfaces by currents established by the high speed rotation of the discs.

It is desirable to control the flow of the currents within a disc drive housing to reduce turbulence in the vicinity of the heads. Turbulence can induce undesired vibrations in the heads, thereby adversely affecting data reading and writing performance.

It is further desirable to reduce the presence of airborne contaminants within the housing. Contaminants can adhere to the recording surfaces and degrade the ability of the heads to write and read data. Recirculation filters are often placed within disc drive housings at suitable locations to filter the recirculating currents.

Disc drive designers are constrained by a number of factors, including continually reduced form factors and internal clearance issues, to provide effective filtering and air flow control. Thus, with the continued demand for higher performance data storage devices, there remains a continual need for improved approaches to directing and filtering recirculating currents within such devices. It is to such improvements that the claimed invention is directed.

SUMMARY OF THE INVENTION

In accordance with preferred embodiments, a plenum assembly is provided for use in a data storage device to direct and filter recirculating currents within the device.

The data storage device includes a housing with an interior, longitudinally extending base surface. A rotatable recording disc is supported within the housing and establishes recirculating currents within the housing during rotation. An actuator operates in conjunction with a voice coil motor to controllably move a data transducing head across a surface of the recording disc.

The plenum assembly preferably comprises a top plate having a longitudinally extending first surface supported in a facing relationship to the base surface. A partitioning wall extends from the top plate to form opposing first and second chambers. A first portion of the recirculating currents is directed along the first chamber and a separate, second portion of the recirculating currents is directed along the second chamber.

A recirculation filter transversely extends across the first and second chambers and intersects the partitioning wall. In this way, the respective first and second portions of the recirculating currents concurrently pass through adjacent sides of the recirculation filter before exiting the plenum assembly and merging into a combined set of recirculating currents.

The first portion of the currents preferably passes adjacent the data transducing head to aerodynamically support the head prior to entering the first chamber. The second portion of the currents preferably passes adjacent the voice coil motor to convectively cool the voice coil motor prior to entering the second chamber. Preferably, the plenum assembly further supports a desiccant filter block adjacent the second chamber to adsorb contaminants from the recirculating currents.

These and various other features and advantages which characterize the claimed invention will become apparent upon reading the following detailed description and upon reviewing the associated drawings.

BRIEF DESCRIPTION OF THE DRAWINGS

FIG. 5 provides an isometric view of a desiccant filter block supported by the plenum assembly.

FIG. 6 provides a front elevational view of the recirculation filter.

FIG. 7 shows an elevational cross-sectional view of portions of the discs and the plenum assembly to illustrate air guides placed at an inlet of the plenum assembly.

DETAILED DESCRIPTION

Figure 1:
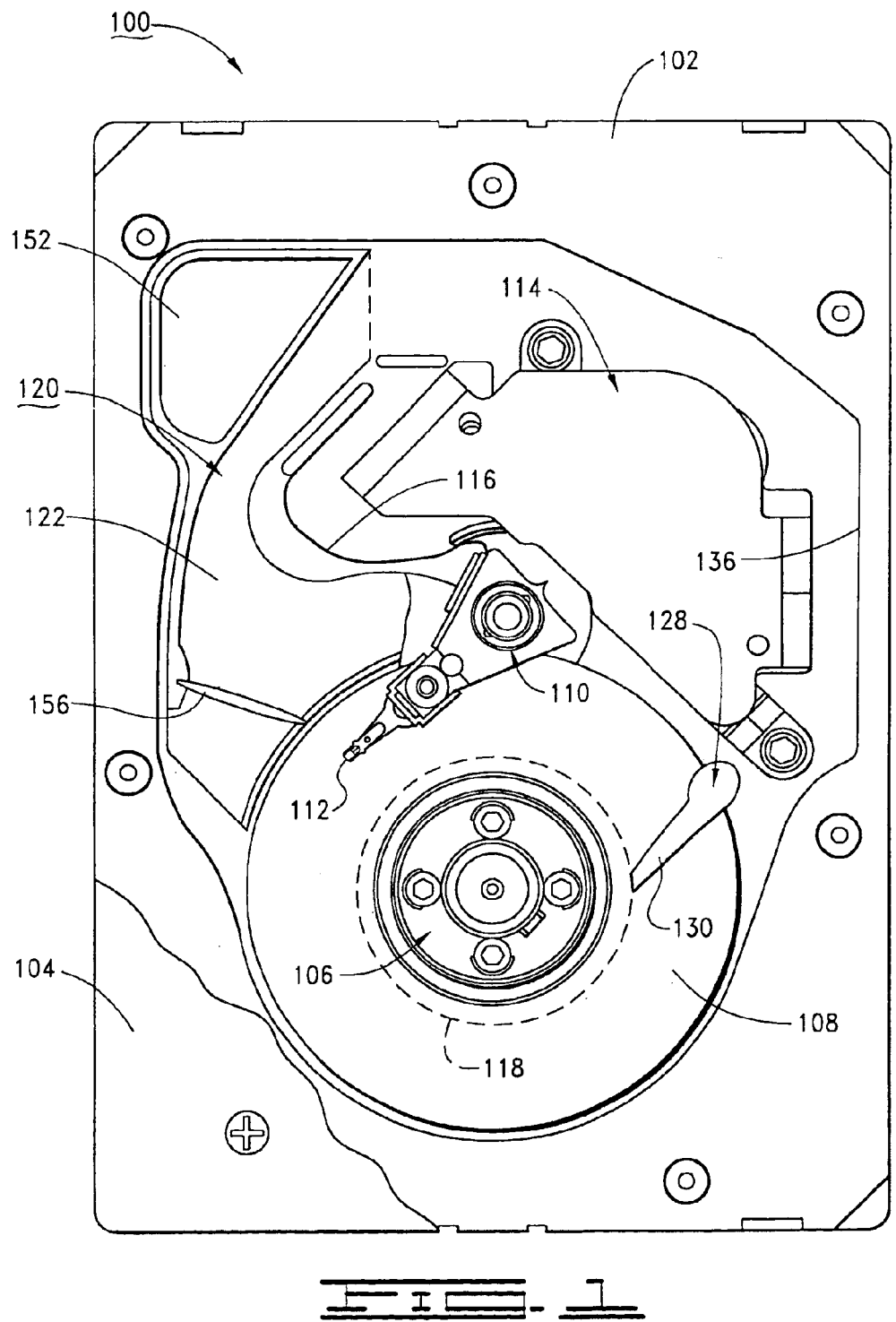
FIG. 1 is a top plan view of a disc drive data storage device incorporating a plenum assembly constructed in accordance with preferred embodiments of the present invention.

FIG. 1 provides a top plan view of a disc drive data storage device 100 constructed in accordance with preferred embodiments of the present invention. A base deck 102 and a top cover 104 (shown in partial cutaway) cooperate to form an environmentally controlled housing for the disc drive 100.

A spindle motor 106 rotates a number of magnetic recording discs 108 at a constant, high speed. A rotary actuator 10 controllably moves a corresponding number of data transducing heads 112 across recording surfaces of the discs 108 through application of current to a voice coil motor (VCM) 114.

The heads 112 are aerodynamically supported over the recording surfaces by currents established by rotation of the discs 108. For purposes of the present discussion, it will be contemplated that the disc drive 100 includes two discs 108 and four heads 112, although other numbers of discs and heads can be used as desired.

A flex circuit assembly 116 provides electrical communication paths between the actuator 110 and a disc drive printed circuit board (PCB) mounted to the underside of the base deck 102. When the disc drive 100 is deactivated, the heads 112 are brought to rest onto texturized landing zones 118 near the innermost diameters of the discs 108 and a latch (not visible in FIG. 1) secures the actuator 110 in a parked position.

Of particular interest in FIG. 1 is a plenum assembly 120, which directs and filters recirculating currents established within the disc drive 100. The plenum assembly 120 is preferably mounted to the base deck 102 during disc drive manufacturing after a head-disc merge operation in which the heads 112 are loaded onto the discs 108.

As will be recognized, a head-disc merge operation generally entails affixing the actuator 110 to the base deck 102 with the heads 112 beyond the outermost diameters of the discs 108, and then rotating the actuator 110 to advance the heads 112 to the landing zones 118. The removable plenum assembly 120 advantageously provides clearance for the appropriate merge tooling and accommodates top-down automated disc drive assembly operations.

Figure 2:
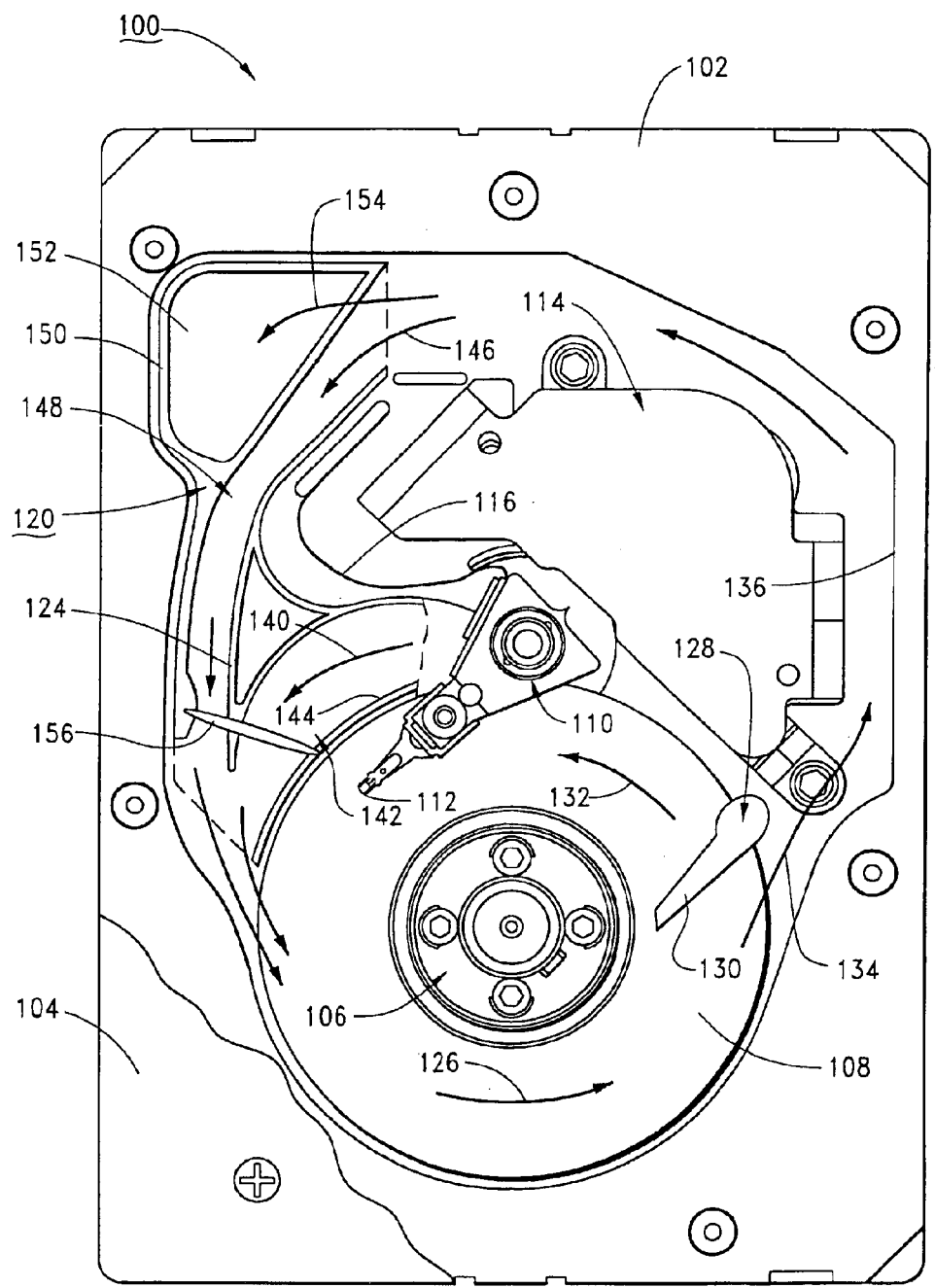
FIG. 2 shows the disc drive of FIG. 1 with a top plate of the plenum assembly removed to show operation of the plenum assembly to direct and filter recirculating currents established by high speed rotation of discs of the disc drive.

The plenum assembly 120 is shown in FIG. 1 to include a longitudinally extending top plate 122. An interior partitioning wall (not visible in FIG. 1) extends downwardly from the top plate 122 to form a pair of adjacent chambers to direct the flow of currents within the plenum assembly 120. FIG. 2 shows the plenum assembly 120 with the top plate 122 removed to illustrate the assembly in greater detail. The aforementioned internal partitioning wall is denoted at 124 in FIG. 2.

During operation, recirculating fluidic currents (shown at 126 in FIG. 2) are established by the high speed rotation of the discs 108. The fluidic currents 126 preferably encounter a fluidic dam 128 having a set of cantilevered arms (the topmost of which is shown at 130) which extend across the respective disc surfaces in close proximity thereto.

The air dam 128 serves to divide the currents 126 along two primary paths. Some currents (denoted by arrow 132) pass through the small gaps between the arms 130 and the discs 108 and proceed on to the heads 112. The arms 130 are preferably configured to provide a substantially laminar flow in these currents to reduce turbulence-induced vibrations in the actuator 110.

Other currents (denoted by arrow 134) are diverted along the lengths of the arms 130 and into a channel formed between the VCM 114 and a side wall 136 of the base deck 102. These currents pass around the backside of the VCM 114 to provide convective cooling for the VCM. Other fluidic circulation schemes that do not circulate fluid around the backside of the VCM 114, however, are readily contemplated.

A first portion of the currents (denoted by arrow 140) flows adjacent the heads 112 and into a first chamber 142 of the plenum assembly 120. The first chamber 142 is defined by the top plate 122 (FIG. 1), the partitioning wall 124, the base deck 102 and a second partitioning wall 144 which extends from the inner edge of the top plate 122 to the base deck 102. It will be noted that an exterior surface of the second partitioning wall 144 serves as a shrouding surface for the discs 108.

A second portion of the currents (denoted by arrow 146) flows past the backside of the VCM 114 and into a second chamber 148 of the plenum assembly 120. The second chamber 148 is defined by the top plate 122, the partitioning wall 124, the base deck 102 and a third partitioning wall 150. The third partitioning wall 150 further preferably surrounds and secures a desiccant filter block 152.

The filter block 152 adsorbs contaminants from currents that do not enter the plenum assembly 120, but rather pass across the top of the block 152 (such as denoted by arrow 154) in the space between the block 152 and the top cover 104. The filter block 152 is preferably composed of silica gel and activated carbon particles to adsorb moisture, hydrocarbons and other contaminants.

In an alternative preferred embodiment, an appropriate aperture is formed in the third partitioning wall 150 so that a side of the filter block 152 is exposed to the second chamber 148. In this way, the second portion of the currents 146 passing along the second chamber 148 flows across the side of the filter block 152.

Continuing with FIG. 2, a flow-through recirculation filter 156 transversally extends across the first and second chambers 142, 148 and intersects the partitioning wall 124 as shown. The filter 156 covers the respective cross-sectional areas of the first and second chambers 142, 148. The first and second portions of the currents 140, 146 thus pass through respective, adjacent sides of the filter 156. The first and second portions 140, 146 then merge back into the combined set of currents 126 upon exiting the plenum assembly 120.

Figure 3:
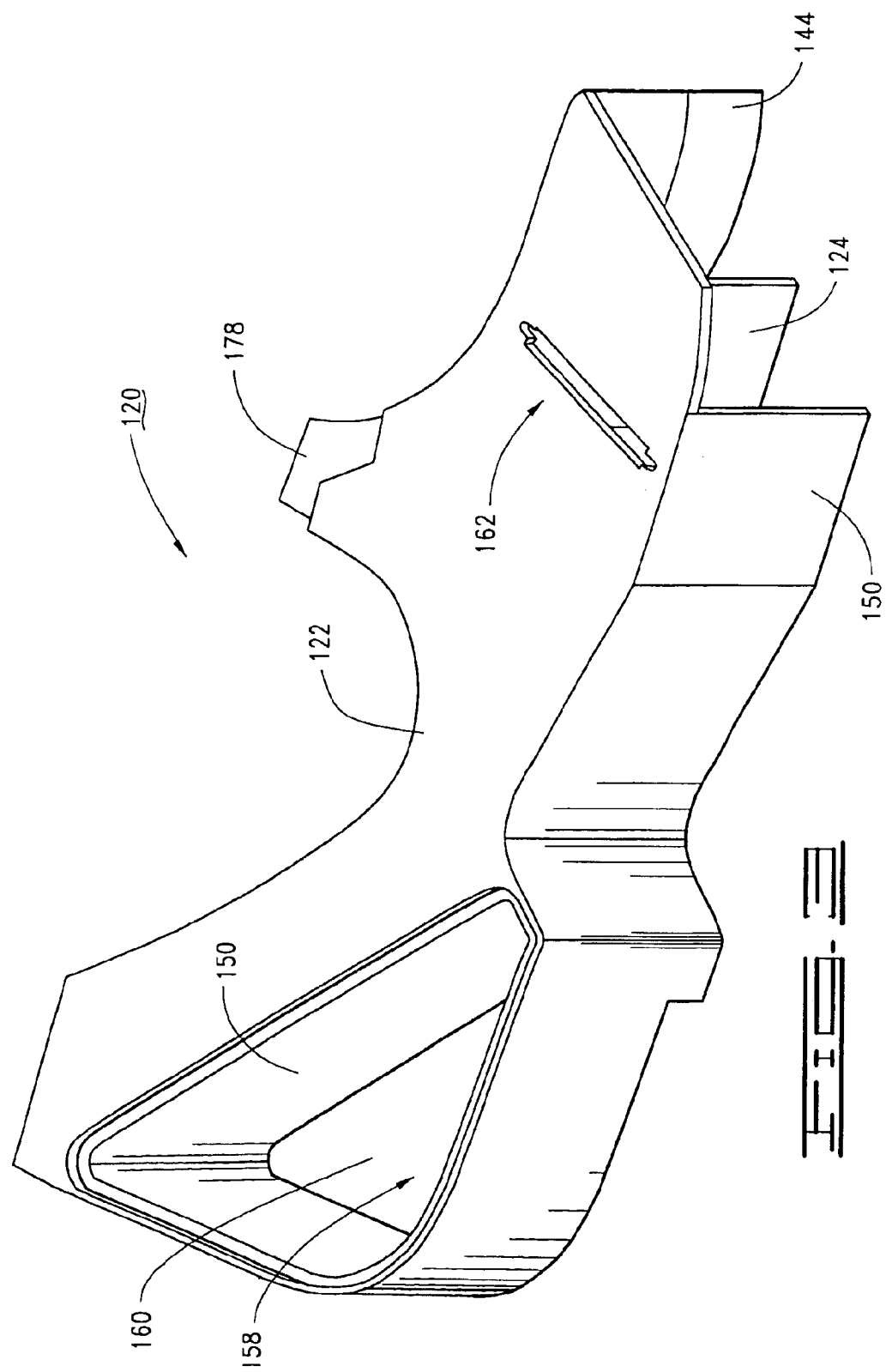
FIG. 3 provides an isometric top view of the plenum assembly.
Figure 4:
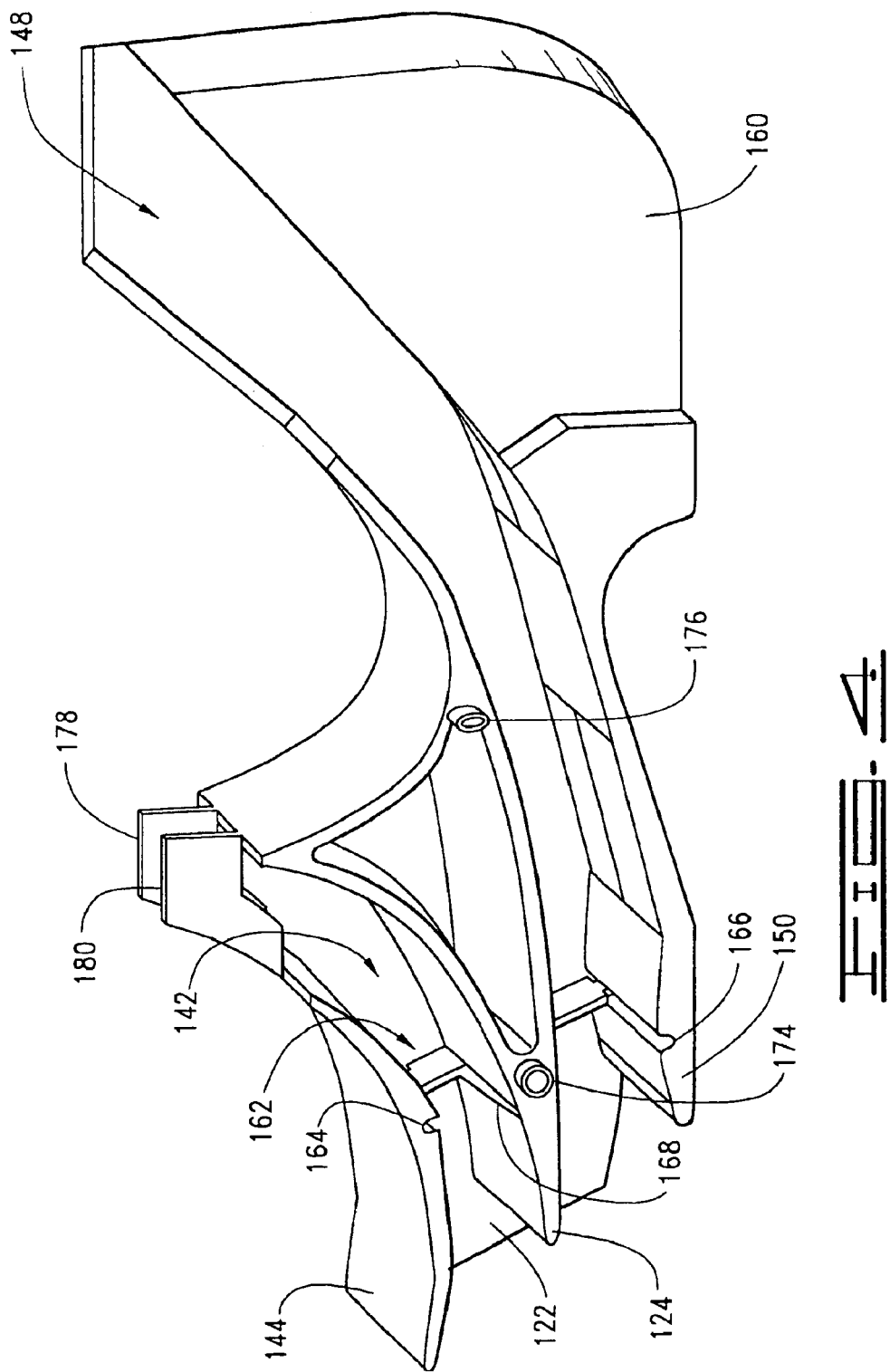
FIG. 4 provides an isometric bottom view of the plenum assembly.

FIGS. 3 and 4 provide isometric views of the plenum assembly 120 prior to installation of the desiccant filter block 152 and the recirculation filter 156, and prior to installation of the completed assembly onto the base deck 102. An isometric view of the desiccant filter block 152 is shown in FIG. 5, and a front elevational view of the recirculation filter 156 is shown in FIG. 6.

The plenum assembly 120 is preferably formed from an injected molded plastic or other material suitable for use within the disc drive housing. A triangularly-cup shaped recess 158 is formed by the third partitioning wall 150 and a horizontally extending base member 160 (the underside of which is visible in FIG. 4). Preferably, the desiccant filter block 152 is inserted into the recess 158 and a thin, permeable membrane (not shown) is heat staked over the opening of the recess 158 to retain the block 152 therein.

The recirculation filter 156 is inserted into the plenum assembly 120 through an aperture 162 in the top plate 122 (FIG. 3). The filter 156 is retained by opposing channels 164, 166 in the partitioning walls 144, 150, as well as by a slot 168 in the intermediate partitioning wall 124 (FIG. 4).

With the filter 156 installed, the currents within the plenum assembly 120 concurrently pass through respective sides of the filter; that is, as shown in FIG. 6 the currents in the first chamber 142 pass through exposed filter portion 170, and the currents in the second chamber 148 pass through exposed filter portion 172. Retention posts 174, 176 (FIG. 4) fit into corresponding apertures (not shown) in the base deck 102 to retain the plenum assembly 120 in place once the plenum assembly 120 is installed into the disc drive 100.

A pair of airflow guides 178, 180 project from the inlet of the first chamber 142 toward the discs 108, as shown in FIG. 7. The guides 178, 180 align with the edges of the discs 108, and provide mechanical clearance for rigid actuator arms 182 of the actuator 110 when the heads 112 are moved to positions near the outermost diameters of the discs 108. The leading edges of the guides 178, 180 are preferably shaped (such as with chamfers) to maintain a substantially laminar flow in the first portion of the currents 140 entering the plenum assembly 120.

The plenum assembly 120 advantageously allows designers to control the flow of fluidic currents within a housing. Separately filtering the respective current paths using a single filter reduces parts counts and costs, as well as isolates particulates and contaminants generated in different regions of the interior of the housing. While two paths have been exemplified herein, any number of multiple paths can be used.

While the foregoing discussion provides various alternative embodiments of the present invention, it will be understood that other variations can be readily incorporated, including affixing the plenum assembly 120 to the top cover 104 instead of the base deck 102 and incorporating some or all of the features of the plenum assembly directly into the top cover 104 or base deck 102.

It will now be understood that the present invention (as embodied herein and as claimed before) is generally directed to a plenum assembly (such as 120) for use in a data storage device (such as 100) to direct and filter recirculating currents within the device.

In accordance with preferred embodiments, the data storage device includes a housing (such as 102, 104) which provides an internal environment for the data storage device, the housing having an interior, longitudinally extending base surface. A rotatable recording disc (such as 108) is supported within the housing and establishes recirculating currents within the housing during rotation (such as 126). An actuator (such as 110) operates in conjunction with a voice coil motor (such as 114) to controllably move a data transducing head (such as 112) across a surface of the recording disc.

The plenum assembly preferably comprises a top plate (such as 122) having a longitudinally extending first surface supported in a facing relationship to the base surface. A partitioning wall (such as 124) extends from the top plate to form opposing, longitudinally extending first and second chambers (such as 142, 148). In this way, a first portion of the recirculating currents (such as 140) is directed along the first chamber and a separate, second portion of the recirculating currents (such as 148) is directed along the second chamber.

A recirculation filter (such as 156) transversely extends across the first and second chambers and intersects the partitioning wall so that the respective first and second portions of the recirculating currents concurrently pass through adjacent sides of the recirculation filter before exiting the plenum assembly and merging into a combined set of recirculating currents.

The first portion of the currents preferably passes adjacent the data transducing head to aerodynamically support the head prior to entering the first chamber. The second portion of the currents preferably passes adjacent the voice coil motor to convectively cool the voice coil motor prior to entering the second chamber.

Preferably, the plenum assembly further supports a desiccant filter block (such as 152) adjacent the second chamber to adsorb contaminants from the recirculating currents.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular application of the plenum assembly without departing from the spirit and scope of the present invention.

In addition, although the embodiments described herein are directed to a plenum assembly for a disc drive data storage device, it will be appreciated by those skilled in the art that the plenum assembly can be used for other types of data storage devices, including optical drives and magneto-optical drives, without departing from the spirit and scope of the claimed invention.

What is claimed is:

1. A plenum assembly configured to direct and filter recirculating currents in a data storage device, comprising:
   a top plate having a first surface;
   a partitioning wall which projects from the first surface to form opposing, longitudinally extending first and second chambers, wherein a first portion of the recirculating currents is directed along the first chamber and a separate, second portion of the recirculating currents is directed along the second chamber; and
   a recirculation filter which transversely extends across the first and second chambers and intersects the partitioning wall so that the respective first and second portions of the recirculating currents concurrently pass through adjacent sides of the recirculation filter before exiting the plenum assembly and merging into a combined set of recirculating currents.

2. The plenum assembly of claim 1 wherein the data storage device comprises a housing having a base surface, and wherein the partitioning wall abuts the base surface so that the first surface is disposed in a spaced relationship to the base surface and the first and second chambers are respectively bounded by the first surface, the base surface, and opposing sides of the partitioning wall.

3. The plenum assembly of claim 1, wherein the partitioning wall is characterized as an intermediary partitioning wall with opposing first and second sides, and wherein the plenum assembly further comprises second and third partitioning walls which project from a base plate on opposing sides of the intermediary partitioning wall so that the first chamber is bounded by the first surface, the second partitioning wall and the first side of the intermediary partitioning wall, and so that the second chamber is bounded by the first surface, the third partitioning wall and the second side of the intermediary partitioning wall.

4. The plenum assembly of claim 1, wherein the data storage device comprises a rotatable recording disc and a moveable data transducing head adjacent the recording disc, and wherein the recirculating currents are established by rotation of the recording disc.

5. The plenum assembly of claim 4, wherein the first portion of the currents passes adjacent the data transducing head prior to entering the first chamber.

6. The plenum assembly of claim 4, further comprising an air guide which projects from the partitioning wall at an elevation substantially that of the recording disc so that the first portion of the currents passes along the recording disc and then along the air guide prior to entering the first chamber.

7. The plenum assembly of claim 4, wherein the data storage device further comprises a voice coil motor which controllably moves the data transducing head across the recording disc, and wherein the second portion of the currents passes adjacent the voice coil motor prior to entering the second chamber.

8. The plenum assembly of claim 1, further comprising a desiccant filter block disposed adjacent the second chamber and configured to adsorb contaminants from the recirculating currents.

9. The plenum assembly of claim 8, wherein the second portion of the currents in the second chamber flow adjacent a surface of the desiccant filter block.

10. The plenum assembly of claim 1, wherein the recirculation filter extends through an aperture in the top plate and a slot in the partitioning wall.

11. A data storage device, comprising:
   a housing which provides an internal environments for the data storage device, the housing having an interior base surface;
   a rotatable recording disc supported within the housing and which establishes recirculating currents within the housing during rotation;
   an actuator supported within the housing and which controllably moves a data transducing head across a surface of the recording disc; and
   a plenum assembly supported within the housing and which directs and filters the recirculating currents, comprising:

a top plate having a first surface supported in a facing relationship to the base surface;

a partitioning wall which extends from the base surface to the first surface to form opposing, longitudinally extending first and second chambers, wherein a first portion of the recirculating currents is directed along the first chamber and a separate, second portion of the recirculating currents is directed along the second chamber; and a recirculation filter which transversely extends across the first and second chambers and intersects the partitioning wall so that the respective first and second portions of the recirculating currents concurrently pass through adjacent sides of the recirculation filter before exiting the plenum assembly and merging into a combined set of recirculating currents.

12. The data storage device of claim 11, wherein the first portion of the currents passes adjacent the data transducing head prior to entering the first chamber.

13. The data storage device of claim 11, further comprising an air guide which projects from the partitioning wall at an elevation substantially that of the recording disc so that the first portion of the currents passes along the recording disc and then along the air guide prior to entering the first chamber.

14. The data storage device of claim 11, further comprising a voice coil motor coupled to the actuator to move the data transducing head across the recording disc, and wherein the second portion of the currents convective cool the voice coil motor prior to entering the second chamber.

15. The data storage device of claim 11, wherein the plenum assembly further comprises a desiccant filter block disposed adjacent the second chamber and configured to adsorb contaminants from the recirculating currents.

16. The data storage device of claim 11, wherein the recirculation filter extends through an aperture in the top plate and a slot in the partitioning wall.

17. The data storage device of claim 11, wherein the plenum assembly further comprises a second partitioning wall which extends from the top plate to the base surface so that the first chamber is bounded by the base surface, the partitioning wall, the that surface and an interior surface of the second partitioning wall, and wherein an opposing exterior surface of the second partitioning wall extends in close proximity to an outermost edge of the recording disc to shroud the disc.

18. A data storage device, comprising;

a housing which provides an internal environment for the data storage device, the housing having an interior, longitudinally extending base surface;

a rotatable recording disc supported within the housing and which establishes recirculating currents within the housing during rotation;

an actuator supported within the housing and which controllably moves a data transducing head across a surface of the recording disc; and first means supported within the housing for directing the recirculating currents into multiple portions, for concurrently filtering said multiple portions, and for subsequently merging said multiple portions back into a common set of recirculating currents.

19. The data storage device of claim 18, wherein the first means comprises a plenum assembly comprising:

a top plate having a first surface supported in a facing relationship to the base surface;

a partitioning wall which extends from the base surface to the first surface to form opposing, longitudinally extending first and second chambers, wherein a first portion of the recirculating currents is directed along the first chamber and a separate, second portion of the recirculating currents is directed along the second chamber; and a recirculation filter which transversely extends across the first and second chambers and intersects the partitioning wall so that the respective first and second portions of the recirculating currents concurrently pass through adjacent sides of the recirculation filter before exiting the plenum assembly and merging into a combined set of recirculating currents.

20. A plenum for directing recirculating fluidic currents around a head supported by an actuator in a data storage device, the plenum defining a first chamber comprising at a proximal end thereof an inlet receivengly engaging first portion of the recirculating fluidic currents after the first portion flows in fluidic contact with the actuator, and the plenum defining a second chamber comprising at a proximal end thereof an inlet receivengly engaging a second portion of the recirculating fluidic currents after the second portion has been diverted so as to not flow in fluidic contact with the actuator, the first and second chambers merging at distal ends thereof to combine the first and second portions of the recirculating fluidic currents through a common outlet.

21. The plenum of claim 20 wherein the outlet directs the combined first and second portions in a direction substantially tangentially to a rotatable storage medium that creates the recirculating fluidic currents.

22. The plenum of claim 21 wherein the data storage device comprises a stripper diverting the second portion away from the storage medium.

23. The plenum of claim 22 wherein the data storage device comprises an arcuate shroud in close mating relationship with an edge of the storage medium and defining an open adjacent a the stripper.

24. The plenum of claim 22 wherein the stripper comprises a vane disposed adjacent surface of the storage medium.

25. The plenum of claim 22 wherein the head is operably interposed between the stripper and the outlet along a rotational direction of the storage medium.

26. The plenum of claim 20 comprising a filter in the plenum through which the first and second portions pass.

27. The plenum of claim 20 wherein the first and second portions are mixed within the plenum after passing through the filter.

28. The plenum of claim 20 comprising a disc edge damper in the first chamber inlet.

29. The plenum of claim 20 comprising an adsorbent material.

* * * * *